(12) United States Patent
Rowe et al.

(10) Patent No.: US 7,008,320 B2
(45) Date of Patent: Mar. 7, 2006

(54) GAMING MACHINE WITH RECEIPT GENERATION CAPABILITIES

(75) Inventors: Rick Rowe, Reno, NV (US); Randy Hedrick, Reno, NV (US)

(73) Assignee: IGT, Reno, NV (US)

( * ) Notice: Subject to any disclaimer, the term of this patent is extended or adjusted under 35 U.S.C. 154(b) by 289 days.

(21) Appl. No.: 09/903,089

(22) Filed: Jul. 10, 2001

(65) Prior Publication Data

US 2003/0013515 A1    Jan. 16, 2003

(51) Int. Cl.
*A63F 9/24* (2006.01)
(52) U.S. Cl. .......................................... 463/25; 705/14
(58) Field of Classification Search ................ 463/1, 463/12–13, 16–20, 25–30, 36, 40–42; 273/143 R, 273/139, 138.1, 138.2, 236–237; 705/14, 705/16–17; 700/91–93; 235/375, 380–382; 340/323 R
See application file for complete search history.

(56) References Cited

U.S. PATENT DOCUMENTS

| | | | |
|---|---|---|---|
| 3,775,593 A | | 11/1973 | Gieringer et al. |
| 5,179,517 A | * | 1/1993 | Sarbin et al. ................. 463/25 |
| 5,259,613 A | | 11/1993 | Marnell, II |
| 5,292,127 A | | 3/1994 | Kelly et al. |
| 5,429,361 A | * | 7/1995 | Raven et al. ................. 463/25 |
| 5,752,882 A | * | 5/1998 | Acres |
| 5,779,546 A | | 7/1998 | Meissner et al. |
| 5,816,918 A | | 10/1998 | Kelly et al. |
| 5,928,082 A | | 7/1999 | Clapper, Jr. |
| 6,007,426 A | | 12/1999 | Kelly et al. |
| 6,015,344 A | | 1/2000 | Kelly et al. |
| 6,048,269 A | * | 4/2000 | Burns |
| 6,244,958 B1 | * | 6/2001 | Acres |
| 6,267,671 B1 | * | 7/2001 | Hogan ......................... 463/25 |
| 6,319,125 B1 | * | 11/2001 | Acres |
| 6,371,852 B1 | * | 4/2002 | Acres |

OTHER PUBLICATIONS

U.S. Appl. No. 10/224,167, Office Communication mailed Jan. 25, 2005.

* cited by examiner

*Primary Examiner*—Mark Sager
(74) *Attorney, Agent, or Firm*—Beyer Weaver & Thomas LLP

(57) ABSTRACT

The invention comprises a gaming machine adapted to print receipts. In one embodiment, the gaming machine is associated with a gaming system including a player tracking or reward system. The gaming machine includes a receipt printer/generator. Game play data is stored remote from the gaming machine. In the event the player's play reaches a predetermined level or satisfies particular criteria, the player is provided an award. Information regarding the award is generated and stored remotely, and the gaming machine is caused to print a receipt which may be redeemed for the award. The award may be goods or services, such as a free dinner or additional game play. The award is separate from any winnings associated with a winning outcome of a game played on the machine. In one embodiment, the gaming machine is arranged to print a receipt containing operational data, such as gaming machine accounting or diagnosis information.

16 Claims, 3 Drawing Sheets

GAMING MACHINE WITH RECEIPT GENERATION CAPABILITIES

FIELD OF THE INVENTION

The present invention relates to gaming machines, and more particularly, a gaming machine capable of issuing a receipt or ticket.

BACKGROUND OF THE INVENTION

Currently, a variety of tasks related to the operation of a gaming machine including associated systems and a variety of the services offered to game players, are disjunctive. For example, a gaming machine may be arranged to accept credit cards, coins or cash as a payment form from a player for entitlement to place a bet and play a game. To facilitate these functions, gaming machines may be linked to a first network which is arranged to carry out a credit card authorization function.

A gaming machine may also include a card reader for reading information from a player tracking card and for tracking player play and rewarding awards for play. For this purpose, gaming machines may be linked to a second, entirely different player tracking network. This network may be arranged to monitor a player's play and award the player "comps" in the event the player's play reaches one or more predetermined levels, as generally reflected by points which are awarded for play. In the event a player receives sufficient points, the player may proceed to a player reward station and "cash in" their points for the comp, such as free games, a free dinner or show. Generally, this requires that a player take their player tracking card to the reward booth after they have stopped playing a gaming machine, provide their player tracking card as identification, and then be awarded a "comp."

The machine may also be provided with a jack into which may be plugged diagnostic equipment for receiving information from a gaming controller of the machine. In order to receive information regarding the operation of the gaming machine, however, a technician must travel to the machine with the necessary diagnostic equipment. Diagnosis information may be viewed on a screen of the diagnositic equipment.

It is desirable to reduce the complexity of the gaming machine, as such both reduces its cost of manufacture and cost of operation. At the same time, it is desirable to make the gaming machine more versatile, offering the player a greater number of services.

SUMMARY OF THE INVENTION

The present invention comprises a gaming machine arranged to print receipts, and methods for generating and redeeming the receipts.

In one embodiment, the gaming machine is associated with a gaming system including a player tracking system. The gaming machine includes a receipt printer/generator. Game play data is stored remote from the gaming machine. In the event the player's play reaches a predetermined level, the player is provided an award. Information regarding the award is generated and stored remotely, and the gaming machine is caused to print a receipt which may be redeemed for the award. The award may be goods or services, such as a free dinner or additional game play. In one embodiment, the award is separate from any winnings associated with a winning outcome of a game played on the machine.

In another embodiment of the invention, the gaming machine is arranged to print a receipt containing operational data, such as gaming machine accounting or diagnosis information. The gaming machine includes a controller. A diagnosis instruction is provided to the controller, such as remotely over a communication link. In response to the instruction, the gaming machine performs a diagnosis and prints a receipt including diagnosis information. This information may comprise a wide range of data, such as meter amounts, coin hopper fill status and the like.

In another embodiment of the invention, the gaming machine is arranged to print a receipt containing information unrelated to game play. The gaming machine may be associated with an information host, such as a hotel reservation/information system. The gaming machine may be arranged to print a receipt including guest hotel charge or check-out information, hotel and restaurant rates, menus, show times and costs, and a wide range of other information.

Further objects, features, and advantages of the present invention over the prior art will become apparent from the detailed description of the drawings which follows, when considered with the attached figures.

DETAILED DESCRIPTION OF THE INVENTION

The invention is a gaming machine arranged to generate receipts, a gaming system including one or more of the gaming machines, and one or more methods of generating and redeeming receipts. In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

Figure 1:
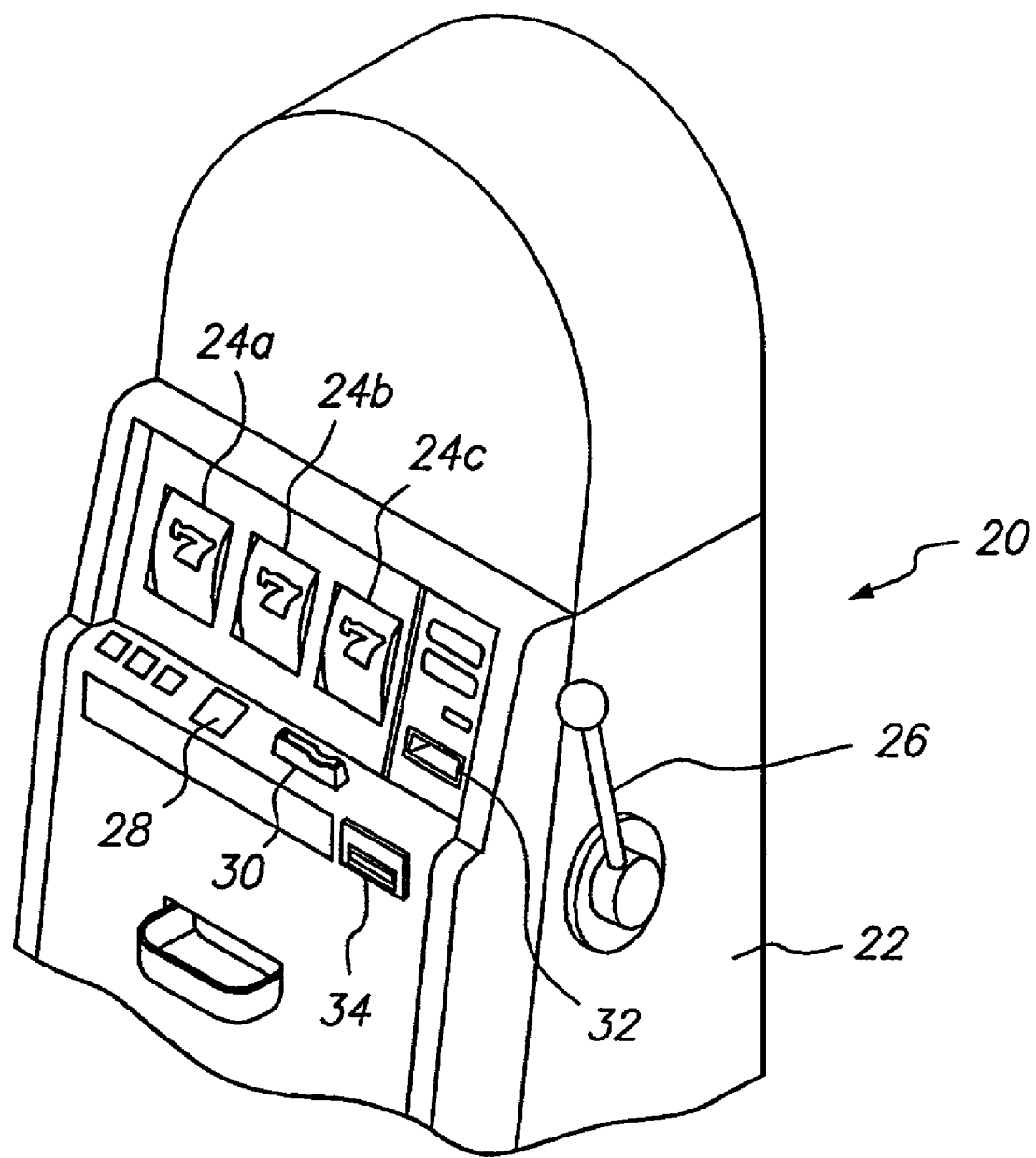
FIG. 1 illustrates a gaming machine adapted to print a receipt in accordance with the present invention.

FIG. 1 illustrates a gaming machine or device 20 in accordance with an embodiment of the invention. In general, the gaming machine 20 is adapted to present at least one game for play to a player. As illustrated, the gaming machine 20 includes a housing 22 which supports and/or houses the various components of the gaming machine 20. In the embodiment illustrated, the gaming machine 20 is adapted to present a game of "slots," and includes three rotating reels 24a, b, c. A handle 26 or spin button 28 may be used to effectuate rotation of the reels 24a, b, c.

In this well known game, a player may be declared the winner of the game and be awarded an award if the result of the rotation of the reels 24a, b, c is a predetermined combination of symbols. It should be understood that the gaming machine 20 maybe adapted to present one or more of a wide variety of games. Depending upon the game presented, the configuration of the machine may vary. For example, in the event the gaming machine 20 is adapted to present the game of video poker, then the gaming machine 20 may include a video display.

In one or more embodiments of the invention, the gaming machine 20 is adapted to present a wager-type game. In this arrangement, a player is required to place a bet or wager in order to participate in the game. In the event the outcome of the game is a winning outcome, then the player may be provided with an award. In one arrangement, the award may be winnings in proportion to the amount wagered or bet by the player. The winnings may comprise coins or paper currency, or credit redeemable for coins, paper currency or prizes.

In order to accept a wager, the gaming machine 20 may include a coin acceptor 30 for accepting coins. The gaming machine 20 may also include a bill acceptor or validator 32 for accepting paper currency. The gaming machine 20 maybe provided with other means for accepting or verifying value, such as a credit card reader.

Preferably, in accordance with one embodiment of the present invention, the gaming machine 20 includes at least one means for generating a receipt. In one embodiment, this means comprises a receipt printer 34. The receipt printer 34 may comprise a variety of now known or later-developed devices. In general, the receipt printer 34 comprises a device for generating a receipt having information associated therewith. In one embodiment, the receipt is generated by printing, such as with ink, information onto an element. It is contemplated, however, that the information need not be printed, but may be generated and associated with the receipt in other manners. For example, electronic data may be generated and then "written" to a magnetic stripe of the receipt.

In a preferred embodiment, the receipt is constructed from paper or a similar material. The receipt may comprise a wide variety of other elements or members, however, such as cards or the like. While the term "receipt" is used herein, it will be appreciated that these elements may be referred to as vouchers, tickets or the like.

Though not illustrated in detail, the gaming machine 20 includes appropriate elements for generating the receipts. As illustrated, the gaming machine 20 includes a printing device 34. The gaming machine 20 may also includes a receipt storage device for storing blank or unprinted receipts. In one or more embodiments, a controller is provided for controlling the operation of the printing device 34. As is well known, the gaming machine 20 may include a master gaming controller (not illustrated) for controlling the operation of many of the peripheral devices of the gaming machine 20, such as lights, input buttons, coin and bill acceptors and the like. The gaming controller may include a bus with which a printer controller is associated. In this manner, the gaming controller may provide instructions, such as print instructions, to the printer for printing receipts.

Figure 2:
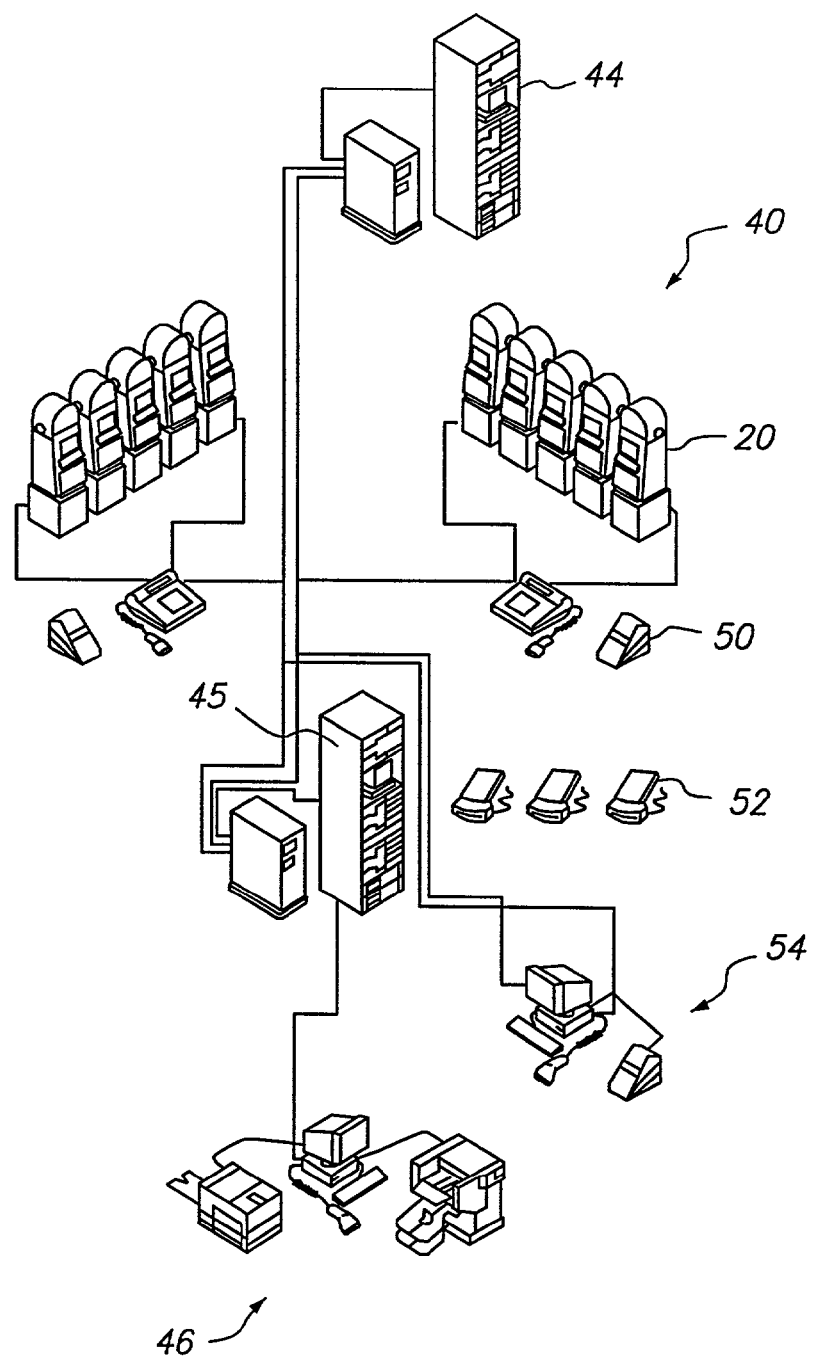
FIG. 2 illustrates a gaming network including a plurality of gaming machines in accordance with the present invention.

In a preferred embodiment, the gaming controller of the gaming machine 20 is associated with other devices, such as through a wired or wireless network, which will be described in more detail below. FIG. 2 illustrates one particular environment/application of the method and apparatus of the invention. As described in more detail below, this preferred environment/application comprises a gaming system 40. The method and apparatus of the present invention may be applied to a number of different environments, including but not limited to food service, entertainment shows, promotional game play, or generally to events or activities where receipts may be issued and redeemed or used.

In general, the system 40 includes at least one gaming machine 20. As illustrated, in a preferred embodiment, the system 40 includes a plurality of gaming machines 20. Each gaming machine 20 is arranged to present one or more games to a player. The game presented at each machine may be the same or different.

In a preferred embodiment, the gaming machines 20 are associated with a player tracking or reward system host 44. One or more appropriate communications links, whether wired or wireless, permit information to be transferred to and from each gaming machine 20 and the player tracking host 44. The player tracking host 44 may comprise a single computer or a group of computers associated with one another via one or more communication links forming a network.

In one embodiment, the player tracking host 44 is associated with a player tracking/reward or "comp" function. The player tracking host 44 may thus be adapted to aggregate game play data regarding the players playing the gaming machines 20. This data may include information such as the length of time of game play, amounts bet, amounts awarded, and a wide variety of other information. The player tracking host 44 may also store information regarding receipts which are issued for "comps," as described in more detail below. In general, each gaming machine 20 is adapted to transmit the player tracking data over the communications link(s) to the player tracking host 44.

In one embodiment, the player tracking host 44 includes at least one data storage element for storing the player information. The data storage element may comprise a hard drive, RAM, tape drive, CD or other memory or data storage member or element. The player tracking host 44 also includes necessary communications equipment, such as network cards or the like for receiving and sending information.

In a preferred embodiment, the gaming machines 20 are also associated with a payment host 45. The payment host 45 may be similar to the player tracking host 44, and comprise a computer or group of computers and include memory or other data storage devices. In one embodiment, the payment host 45 is adapted to store information regarding payment information and receipt or ticket information when a receipt or ticket has associated value.

The gaming system 40 may include a wide variety of other hosts or be associated with other networks, such as a security monitoring network or the like. As illustrated, in one or more embodiments, a variety of sub-systems or devices are associated with the gaming system 40. In one embodiment, a soft count system 46 is associated with the gaming system 40. The soft count system 46 is for use in a soft count process for reconciling the amounts received and paid by the gaming machines 20 with bills or receipts which have been accepted by the gaming machine 20 and removed therefrom.

One or more receipt validation mechanisms 50, wireless receipt terminals 52 and cashier cage systems 54 may be associated with the gaming system 40. The manner by which information from these mechanisms, terminals and systems is transmitted to and from other mechanisms, terminals and systems may vary. For example, as illustrated, the wireless receipt terminals 52 may comprise handheld devices adapted to transmit and receive information from the payment host 45 via a wireless communications link. The other systems, including the soft count system 46, receipt validation mechanisms 50 and cashier cage systems 54 are illustrated as being hard wired to the player tracking host 44 and payment host 45.

The receipt validation mechanisms 50, wireless receipt terminals 52 and cashier cage systems 54 may be arranged to include a variety of apparatus, including both hardware and software, for performing a variety of functions. In one or more embodiments, these mechanisms, terminals and systems may include receipts generation/printing devices and receipts scanning or reading devices. In this manner gaming personnel may issue receipts to players and players may cash-in receipts after play at a variety of locations.

The receipts which are generated/printed by the gaming machines 20 (and optionally by other devices such as the receipt validation mechanisms 50, wireless receipt terminals 52 and cashier cage systems 54) may have a variety of information associated therewith and may be used for a variety of purposes. In one embodiment, the receipts may be representative of value. As an example, in the event the player is declared a winner of a game played on a gaming machine 20, the player may be paid an award. As noted above, the award may be in the form of coins. In one embodiment of the invention, however, the award maybe associated with or represented by a receipt. For example, in the event the player wins 100 dollars and the player wishes to discontinue playing the gaming machine 20, the gaming machine 20 may print a receipt representing this winning amount. As detailed below, data regarding the ticket and the winning amount is preferably transmitted to the payment central host 45. Such a receipt may be referred to as a "value" receipt.

In one or more embodiments, the gaming machine 20 may be arranged to accept such a (value) receipt, thus forming a basis by which the player may provide credit to play the game. As illustrated in FIG. 1, the gaming machine 20 includes a validating mechanism 32 and a storage device for the bill monies and receipts. The validating mechanism is arranged to verify the authenticity of the bill money or a receipt which is supplied by the player, thus establishing the right of the player to play the game. For example, the validating mechanism is arranged to reject a counterfeit paper item which a player attempts to pass as a treasury bill. The operation of these mechanisms are well known. Additional details regarding the validation of a value type receipt are disclosed below.

Figure 3A:
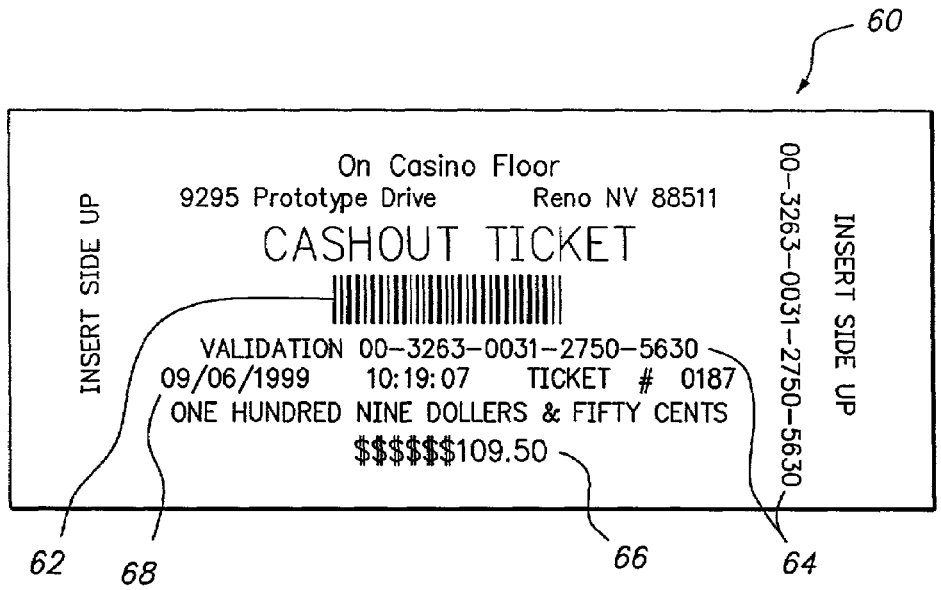
FIG. 3(a) illustrates a "value" type receipt which may be issued/generated with a gaming machine in accordance with the invention and be accepted by a gaming machine as value for bets.
Figure 3B:
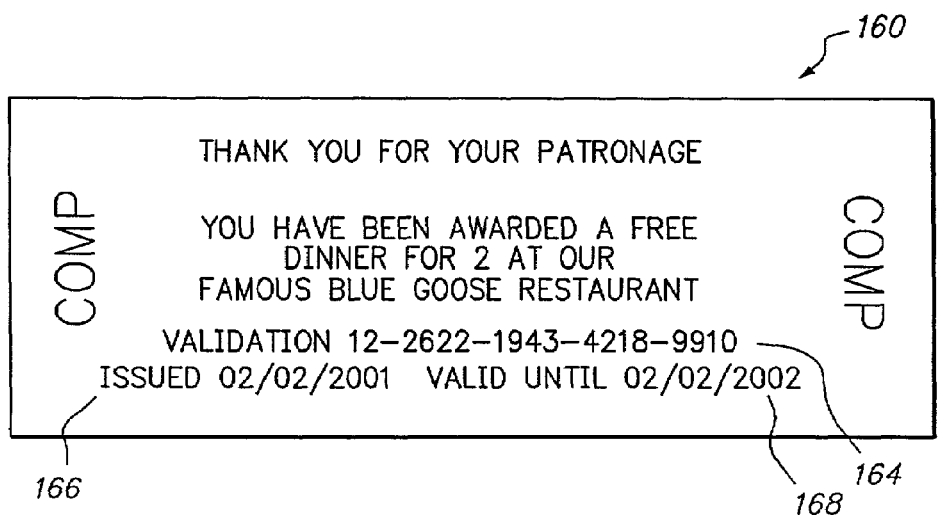
FIG. 3(b) illustrates a "comp" type receipt which may be issued/generated with a gaming machine in accordance with the invention and redeemed for an award or prize.

Receipts of different types or for different purposes may have a variety of different forms. Referring to FIG. 3, there is illustrated a receipt 60 which may be representative of cash value or currency. In one or more embodiments, the information associated with the receipt 60 includes machine readable information. As illustrated, this information comprises a UPC type bar-code 62. In one or more embodiments, the bar-code 62 may represent encoded information such as the value of the receipt 62 and other information. In a preferred embodiment, the bar code 62 represents the validation code or other unique identifier 64. Information such as the value 66 of the receipt 60 is obtainable utilizing the validation code or number 64 this information capable of being located or stored remote from the receipt 60 itself, as described in detail below. The receipt 60 may include other information, such as a date of issuance 68.

As noted above, the receipt 60 may have a variety of forms. For example, the bar coding may be accomplished with different colors of material comprising the receipt 60, such as by exposing thermoplastic to high heat or the like to generate the spaced bars. The magnetic stripes or chips or similar information storage elements may be associated with the receipt 60 for use in storing the information. Information may be coded in the form of punch holes or other patterns of material or voids of material.

In accordance with the present invention, the gaming machine 20 is preferably adapted to generate or print receipts of other types or associated with functions/purposes other than for use in replacement of currency or value as described above. In one or more embodiments, the gaming machine 20 is arranged to print receipts which represent "comps," gratuities or other awards. It is common for frequent players to be rewarded for their play. In an embodiment of the invention, a player's play is rewarded with a receipt which may be redeemed for a prize or award. For example, the receipt may be redeemable for a free dinner at a restaurant, a free night or nights stay in a hotel room, airline miles, travel, luggage or a wide range of other goods or services. Receipts may also be awarded or issued which simply provide information, such as hotel room charges, hotel room check-out information or receipts, show or restaurant times, restaurant menus and prices, and a wide range of other information.

Such "comp" or award receipts may be generated in a number of manners. In one embodiment, a player's play of any gaming machine associated with the gaming system 40 is tracked. Data regarding the player's play is stored at the player tracking host 44. The player tracking host 44 is also preferably arranged to monitor the play data such that, if the player reaches predetermined levels of play or other criteria of play exist, the player is awarded a "comp." In another embodiment, the play of a particular gaming machine 20 may trigger a "comp" award. As is known, the tracking of the play of a particular player may be initiated by the player identifying themselves, such as by swiping a magnetic stripe of a player tracking/identification card through a card reader associated with the gaming machine 20.

The criteria for awarding a "comp" or "complimentary" reward may vary. In a preferred embodiment of the invention, the player is rewarded a comp based upon criteria independent of the direct outcome of a game played at the gaming machine. In this regard, the award may be referred to as a bonus, as the award is above and beyond any award provided to the player based in the above outcome of a players game, and does not require further or additional consideration (such as an additional bet) by the player. As noted, the comp may be awarded based upon frequency or time of play, actual losses, theoretical win or a wide variety of criteria other than the direct win or loss of a game.

A "comp" receipt 160 may also be awarded to a player at the discretion of the game operator or casino. For example, regardless of the length of time a player has been playing, the operator may instruct the machine 20 to issue a receipt for a prize or award. The operator may also cause receipts representing awards independent of game play to be issued at several gaming machines, such as a promotion.

Once a player is entitled to a "comp," the player tracking host 44 is adapted to send a signal to the gaming machine 20 to cause the gaming machine to issue a "comp" receipt. In one embodiment, the player may be provided with an opportunity to select the "comp" or award which is given. For example, for reaching a predetermined level of play, a player may be permitted to select one prize from a list of prizes. This list may be transmitted from the player tracking host 44 for display by the gaming machine 20 to the player. The player may then input their selection. The gaming machine 20 is then arranged to print the receipt representative of the "comp." Information regarding the comp which has been awarded is stored at the player tracking host 44 and printed on the receipt.

FIG. 3(*b*) illustrates an embodiment of a "comp" or award receipt 160 in accordance with the invention. As illustrated, the receipt 160 includes text indicating that the receipt 160 has been awarded as a result of the player's play. The nature of the comp is indicated, such as the fact that the receipt represents a free dinner award. A receipt identifier 164 is printed on the receipt 160. In addition, an issue date 166 and expiration date 168 are printed on the receipt. The "comp" type of receipt 160 may have other forms than that illustrated. For example, the receipt 160 may be similar to the receipt 60 illustrated in FIG. 3(*a*), and include a readable bar code.

In another embodiment of the invention, a gaming machine 20 is adapted to print a receipt which includes game accounting, security or diagnosis information. In one embodiment, a technician may open the machine 20 and cause the gaming controller to perform a diagnostic function (such are by simply pressing a button or providing other input). The gaming controller is then arranged to print out the results of the diagnostic on a receipt with the receipt printer 34. It will be appreciated that the variety of information which may be printed depends substantially upon the nature of the diagnostic which is performed. Such diagnostic functions are well known, and may be programmed into the gaming controller. It will also be appreciated that the manner by which the diagnostic is initiated may vary. For example, in one embodiment, a simple key switch may be located on the exterior of the gaming machine 20. When the technician turns the key switch with the appropriate key, the controller may be caused to perform a diagnosis and print the results.

In accordance with the present invention, the receipt printer 34 of the gaming machine 20 may be adapted to print a wide range of other information. For example, a gaming representative may cause the gaming machine 20 to print audit information, such as information relating to the amounts bet and awarded as a result of play of the machine 20. An audit receipt may be printed as needed or automatically at intervals. The audit receipt may include information such as, but not limited to, coins paid in and coins paid out, currency in, and the time that a cash box was removed. The gaming machine 20 may be adapted to print a receipt having information regarding a wide variety of functions, such as a coin hopper fill status, meter/counter data and the like.

In one or more embodiments of the invention, the gaming machine 20 may be instructed to print a receipt (such as a diagnosis or audit receipt) from a remote location. For example, a gaming representative may send a diagnosis signal to the gaming machine 20 via a network link. In one embodiment, a gaming representative may use a wireless control device, such as one of the hand-held units 52, to send a command to cause the gaming machine 20 to print a receipt with desired information.

Regardless of the receipt's type, a variety of limitations may be imposed on the use of a receipt. For example, as illustrated in FIG. 3(*b*), a receipt may be deemed to expire after a certain period of time if not used. Preferably, the expiration date is stored at the player tracking host 44 such that is a person attempts to redeem the receipt (as described below) after its expiration period, that receipt is rejected. A receipt may also be redeemable at one or more specific locations or at specific times.

As detailed below, in accordance with one or more embodiments of the invention, there are provided methods and devices for validating a receipt. As used herein, the terms validation or entitlement generally mean establishing the right of player to use the receipt, such as to redeem the receipt for an award or "comp," or to use the value associated with the receipt, as in placing wagers or bets. Thus, one aspect of the invention is validating a "value" type receipt 60 to establish a player's right to use the value associated with the receipt. Similarly, one aspect of the invention is the validating of a "comp" type receipt 160 to establish the right of a player to the award or comp associated therewith.

In one or more embodiments, a receipt 60, 160 may be redeemed for value in coins or currency or a specific award or prize. If the receipt has little associated value or is associated with a minimal award, then the receipt may be redeemed after simple inspection by a gaming representative or other authorized personnel. For example, if the receipt entitles a person to a free dinner, the hostess at the restaurant may visually inspect the receipt to determine that it is still valid and is to be redeemed for a free dinner at that particular restaurant.

In one or more embodiments, validation of a receipt 60, 160 may include confirmation that the party redeeming it is the rightful owner. For example, in the case of a "comp" receipt 160, the receipt 160 may include a player tracking number or other identifier printed thereon (or stored at the player tracking host 44). At the time of redemption, the player may be required to provide identification verifying that they are the same party that was issued the receipt 160.

In a preferred embodiment, the receipt 60, 160 is verified using data stored at the appropriate database, such as at the tracking host 44 or the player host 45. As stated above, when a receipt 60, 160 is generated, a corresponding data file or other record is also generated. In one embodiment, the receipt 60, 160 record is stored in one or more locations, such as the player tracking host 44 or payment host 45.

Preferably, when a receipt 60, 160 is redeemed, the authenticity of the receipt 60, 160 is confirmed, and the status of the receipt 60, 160 and related information is updated. A receipt 60, 160 may be presented or redeemed in a variety of manners. As noted above, a player having a value receipt 60 may travel to a gaming machine 20 which is arranged to accept receipts and utilize the receipt to provide the necessary credit to entitle the player to play the game. In one or more embodiments, the player is not limited to presenting a receipt 60 to the same gaming machine 20 which issued it, but may present it to any gaming machine 20 associated with the system 40. A player may also be permitted to redeem a value receipt 60 at remote location, such as a receipt validation mechanism 50, cashier station 54 or other location. Such a station may be located at a cashier cage, or a moving cart or other locations.

A player may be permitted to redeem an award or "comp" receipt 160 at a variety of locations. One location may be the specific location providing the good or service which the receipt represents. For example, if the receipt 160 is for a dinner or show, then the player may redeem the receipt at the dinner or show, just as if the player had cash or a ticket. In another embodiment, the player may be required to redeem the receipt 160 at one or more specified locations, such as a central station. For example, a player may be required to redeem their receipt 160 for a free show at the ticket or box office for the show for exchange of the receipt for an actual ticket to the show.

Regardless, in one embodiment, the receipt 60, 160 is validated using a validating mechanism. The validating mechanism is arranged to verify the authenticity of the receipt 60, 160 which is supplied.

In one embodiment, the gaming machine 20 includes a validating mechanism (such as reader 32) for reading the bar code 62 and sending the validation code 64 or other identifying information for a value receipt 60 represented by the bar code 62 to the payment host 45. The payment host 45 may then confirm whether the voucher 24 is valid and the value which it represents. If the payment host 45 indicates that the receipt 60 is valid, then the gaming machine 20 is arranged to credit the player the value of that receipt 160. Further, a transaction record associated with the gaming machine 20 is updated, which record makes it possible to determine the total value of all bill monies and receipts 60 accepted by that particular gaming machine.

As provided above, the payment host 45 may verify the authenticity or validity of a particular receipt 60 by comparison to a voucher record. In one or more embodiments, the verification includes matching the code 64 read from the receipt 60 against the records to determine that a receipt 60 having the particular code was authorized and issued. Next, the verification includes determining that the receipt 60 is indicated as outstanding and not already paid. The verification may also include confirming the value of the receipt 60.

In one or more embodiments, once the receipt 60 is accepted, verified and its value credited, the receipt record is updated. In one embodiment, the voucher record may be updated to reflect that the receipt 60 has been paid and is no longer outstanding. In this manner, if the receipt 60 is thereafter stolen and re-presented, during the verification step the receipt 60 will be identified as previously presented and will not be paid again. In this method, the step of updating may comprise the writing or rewriting of the voucher record stored at the payment host 45.

In one embodiment, when a player attempts to redeem a "comp" receipt 160, information associated with the receipt 160 is preferably verified with the stored receipt data. In one embodiment, a receipt reader is located at each redemption point. For example, a receipt redemption station 50 maybe located at each restaurant, ticket office, or other prize redemption location. In the preferred embodiment, information associated with the receipt 160 is inputted, such as by key input of the code 164, or by optical reading the information or the like. This information is then transmitted to the player host 44 for confirmation/comparison. If the receipt 160 is valid, an instruction is returned to the station that the redemption is allowable. If the receipt 160 is invalid, such as if it is expired or is counterfeit, then such an indication is provided. If the receipt 160 is redeemed, then the data regarding that receipt is preferably updated, such as by indicating that the receipt 160 has been redeemed and is no longer valid.

The methods and devices of the present invention have numerous advantages. First, a gaming machine 20 is adapted to generate, such as by configuring data and printing, a receipt. This receipt may be representative of a value or award, be used for direct redemption of a good or service, provide general information, such as diagnostic or accounting data, or otherwise be used for a wide variety of purposes. In this manner, the gaming machine 20 is capable of carrying out a plurality of functions which were previously not permitted.

As one aspect of the invention, a player may be awarded a "comp" directly by a gaming machine while playing the gaming machine. The player is no longer always required to travel to a remote player reward station to determine if they are entitled to a "comp" and be provided that comp. For example, a player may be rewarded a free dinner for their play. A receipt may be immediately issued to the player when the comp is achieved, and the player may then travel directly to the restaurant to obtain their reward.

As another aspect of the invention, gaming machine diagnostic, accounting and similar information may be obtained from a receipt printed by the gaming machine. This avoids the need for additional diagnostic equipment and the like. A technician or gaming representative may simply instruct the gaming machine 20 to provide the requested information which is then printed on the spot. A technician or gaming representative may travel from adjacent gaming machine to gaming machine and quickly obtain information for a variety of purposes, including comparison to other machines.

As another aspect of the invention, the gaming machine is adapted to print an information receipt providing information to the player/user of the gaming machine. In one or more embodiments, other servers or computers may be in communication with the gaming machine. These servers may provide data representing a wide variety of information, such as restaurant menu information, show times and rates and the like. In one embodiment, the gaming machine may be arranged to be in communication with a hotel reservation/accounting system permitting a player/user of the gaming machine to check out or obtain information such as room charge information.

In one or more embodiments, the gaming machine may be adapted to display and print menu information to a player. The player may use the menu to select particular information or activities to be associated with the receipt. For example, the gaming machine may include a "menu" button causing a menu to be displayed. The menu may include "access room account" as a selection which the player/user may select in order to obtain their room charge information, which information is then printed out and dispensed to the player.

In accordance with the invention, a variety of methods are provided for verifying information, such as for the redemption of a receipt. The receipt may be verified with receipt data stored at a remote location.

It will be understood that the above described arrangements of apparatus and the method therefrom are merely illustrative of applications of the principles of this invention and many other embodiments and modifications may be made without departing from the spirit and scope of the invention as defined in the claims.

We claim:

1. A method of issuing a receipt redeemable for an award to a player of a gaming machine associated with a gaming system including one or more gaming machines comprising:
   generating data regarding a player's activity associated with the play of said one or more gaming machines;
   determining if said player is entitled to an award based upon the player's play activity data independent of the direct outcome of a specific game or games; and
   printing said receipt in the form of a tangible medium, including player readable indicia, for said player at said gaming machine for redemption by said player for said award at a location remote from said gaming machine.

2. The method in accordance with claim 1 including the step of transmitting said play activity data to a remote device.

3. The method in accordance with claim 2 wherein said determining step comprises comparing said transmitted play activity data to predetermined criteria for awarding an award.

4. The method in accordance with claim 1 including the step of transmitting data regarding a receipt to be printed from a remote device to said gaming machine.

5. The method in accordance with claim 1 wherein said generating step comprises the printing of said receipt and issuance of said receipt to said player.

6. A gaming system comprising:
   at least one gaming machine adapted to accept credit from a player, present a game for play by a player, and pay a winning in the event a winning event is achieved by play of the game;
   at least one host with which said at least one gaming machine is associated, said at least one host arranged to receive information regarding player play from said at least one gaming machine, to determine if an award should be issued for play by said player independent of whether the outcome of play of said game is a winning outcome, said at least one host arranged to transmit award information to said gaming machine; and
   a receipt generator located at said gaming machine configured to print a receipt in a tangible medium, including player readable indicia, for said player, and associated with said award in response to reward information being transmitted to said gaming machine from said at least one host.

7. The gaming system in accordance with claim 6 wherein said information regarding said player play comprises information regarding amounts bet by said player.

8. The gaming system in accordance with claim 6 wherein said information comprises information regarding the identity of said player.

9. The gaming system in accordance with claim 6 wherein said receipt is redeemable for a prize.

10. The gaming system in accordance with claim 6 including a wireless communication link between said gaming machine and said at least one host.

11. A method of utilizing a receipt in a gaming system comprising:
   providing at least one gaming machine, said gaming machine arranged to present at least one game for play by a player and print a receipt associated with an award based upon the player's play of one or more gaming machines associated with said gaming system;
   awarding a reward if said player receives a winning outcome;
   generating game play data associated with the player's play of said one or more gaming machines associated with said gaming system;
   transmitting said game play data to a remote device associated with said gaming system;
   determining if said player is entitled to a bonus award based upon said game play data;
   transmitting bonus award information to a gaming machine played by said player;
   printing a receipt in the form of a tangible medium, including player readable indicia, to said player, and representative of said bonus award from said gaming machine;
   accepting said receipt at a location remote from said gaming machine; and
   providing said bonus award in redemption of said receipt.

12. The method in accordance with claim 11 including at least one receipt validation station associated with said system and wherein said accepting step comprises accepting said receipt at said receipt validation station.

13. The method in accordance with claim 12 including the step of transmitting information regarding said receipt from said receipt validation station to said remote device for validating said receipt.

14. The method in accordance with claim 11 including the step of generating receipt information associated with a bonus award at said remote device.

15. A method of presenting game comprising:
   accepting a wager from the player;
   presenting a game to the player;
   awarding said player a first award if said player receives a winning outcome playing said game;
   generating a bonus award information at remote location;
   transmitting said bonus award information to said gaming machine; and
   printing a receipt in the form of a tangible medium, including player readable indicia, for said player from said gaming machine redeemable for said bonus award at a location remote from said gaming machine.

16. The method is in accordance with claim 15 wherein said bonus award is non-monetary.

* * * * *